United States Patent Office 3,787,582
Patented Jan. 22, 1974

3,787,582
PECTINASE ENZYME TREATING PROCESS FOR PREPARING HIGH BULK DENSITY TEA POWDERS
Gary Warner Sanderson, Englewood, N.J., and William Shaw Simpson, Charleston, S.C., assignors to Thomas J. Lipton, Inc., Englewood Cliffs, N.J.
No Drawing. Filed June 23, 1971, Ser. No. 156,028
Int. Cl. A23f *3/00*
U.S. Cl. 426—50                                    8 Claims

ABSTRACT OF THE DISCLOSURE

Tea extracts, specifically, solubilized add-back tea extracts, are treated with a pectinase enzyme preparation, cooled and spray-dried to a high bulk density to form an instant tea product with improved clarity and color and which has a low tendency to form foam upon reconstitution with cold water.

---

This invention relates to improved tea concentrates and powders and a process for preparing them. More particularly, the invention relates to tea concentrates and powders that have been treated with a pectinase enzyme preparation to improve the clarity and color of beverages made from the tea products and to reduce the tendency of these products to form foam on reconstitution, and to a process for preparing the said concentrates and powders.

Existing commercial tea powders manufactured according to a variety of known procedures have the disadvantage of being less red in color, hazier, and foamier than good quality black tea beverages. These defects have been a serious obstacle to the preparation of instant tea products with a high level of acceptability by the consumer of soluble tea powders for use in iced tea beverages. The tendency of currently available instant tea products to foam on reconstitution in vending machines is particularly troublesome.

It is therefore an object of the present invention to provide a spray-dried tea concentrate and powder which will form a minimum amount of foam upon reconstitution with cold water and which provides an instant tea beverage having improved clarity and color. It is a further object of this invention to provide a method for preparing such a tea product.

It has now been discovered that the foam-forming properties of instant tea products are in part due to the nature of the carbohydrates, and specifically the pectins, present in the instant tea materials. Accordingly, the carbohydrates in the tea extracts are degraded through enzymatic digestion to produce an instant tea product having a significantly reduced tendency to foam on reconstitution with cold water. Furthermore, by altering the pectins present in the tea extract the instant tea powders are upon reconstitution rendered redder in color and more brilliant in clarity. For instance, under favorable conditions the clarity of the instant tea has been improved by as much as 20 Hunter clarity units.

According to the invention the undesirable effects of discoloration and the excessive formation of foam may be avoided by treating the tea extract with pectinase enzyme preparations such as Klerzyme 200 (a Wallerstein Company product) or Pectinol (a Rohm and Haas product). The pectinase treatment of tea extracts effects an enzymatic alteration of the pectins and yields an instant tea extract with improved color and clarity. Thereafter the treated tea extract is spray-dried to a high bulk density to produce instant tea product with minimal tendency to form foam on reconstitution.

Prior to the addition of the pectinase preparation, the extract is processed by means known in the art. An aqueous extract is prepared from tea leaves and the aroma may be stripped off and concentrated if desired. The extract is then decreamed by cooling it to a temperature at which heavy clouding (or creaming) or separation of a part of the extracted solid material from the solution occurs. The cream portion of the extract can be separated from the main portion of the extract by centrifugation and the separated tea "cream" can then be slurried with water, treated with KOH and thereafter oxygen sparged. The cream is then bleached by adding $H_2O_2$ and brought to a gentle boil. After cooling the mixture, the treated cream is added back to the decreamed extract. $CaCl_2 \cdot H_2O$ is then added to the cream add-back extract, which is held for a period of time and thereafter polished by centrifugation.

Following the decreaming and polishing steps, a pectinase enzyme preparation, Klerzyme 200, is added in the amount of about 2% based on total tea solids to the tea extract containing solubilized tea cream and wherein the temperature is about 90° F. The enzyme containing extract is then held for about 30 minutes after which the extract is subjected to a final polishing by centrifugation which removes the precipitated enzyme and other insolubles. The polished extract can then be concentrated, filled with corn syrup solids and spray-dried to a high bulk density, i.e., about 0.35 g./cc. or higher or freeze dried by means known in the art. The resulting instant tea powder is red in color and more brilliant in clarity than instant teas produced by the same procedure but without the pectinase treatment.

The use of the pectinase preparation according to the above process produces no marked flavor taint and effectively eliminates the tendency of the instant tea powder to form foam when reconstituted. This is especially advantageous when the reconstitution is effected by machine dispensing. Moreover, by treating the cream add-back tea extract with a pectinase preparation the stability of instant tea beverages toward hazing on standing is greatly improved.

Suitable pectinase enzyme preparations are Klerzyme 200 or Pectinol. According to the invention the amount of Klerzyme 200 enzyme preparation, having the strength given in Example 1 below, added to the extract is from about .2% to about 3%, and preferably about 2%, based on the weight of the solids present in the aqueous tea extract. The percent of the pectinase enzyme preparation that is added to the tea extract is critical in view of the fact that too little unduly prolongs the reaction, while the use of excessive amounts creates a haze problem of its own.

The temperature which is maintained during the enzyme treatment of the tea extract is from about 50° F. to about 110° F. and preferably from about 80° F. to about 90° F. This range is critical since temperatures which are too low unduly prolong the treatment period and temperatures which are too high inactivate the enzyme. The properties of the particular pectinase preparation used should be taken into account in determining the optimum temperatures to be used.

The amount of time that the enzyme is held in the extract is from about 10 to about 180 minutes, and the amount of time required in this phase is determined by the amount of enzyme used and the temperature at which the treatment is carried out. For example, as the amount of enzyme used approaches the lower limits of the above range a longer contact time between the enzyme and extract is required, and the converse of this is also true. Furthermore, as the temperature at which the reaction is carried out increases the rate of the reaction also increases.

3

The following examples are intended only to illustrate the process and results obtained therefrom and should not be construed as limiting the scope of the claimed invention in any way. The scope of the invention is defined only by the appended claims.

EXAMPLE 1

The pecinase activity of enzyme preparation used in the following examples was determined as follows: The method used to assay for pectinase activity was essentially that described for polygalacturonase in Methods in Enzymology (Colowick and Kaplan, eds.), 1955, vol. 1, pp. 162–164. The reaction mixture consisted of 100 ml. of 0.4% pectic acid (Nutritional Biochemicals Corp., Cleveland, Ohio) adjusted to pH 4.0 with NaOH, and the enzyme preparation to be assayed for pectinase activity. This mixture was reacted for 5 min. at 25° C. After reaction, a 10 ml. aliquot of the reaction mixture was pipetted into 1.8 ml. of 1 M $Na_2CO_3$ solution in a glass-stoppered flask. 10 ml. of 0.1 N iodine solution was added, mixed, and the mixture was left to react in the dark for 20 min. Then, 4 ml. of 2 M $H_2SO_4$ was added, and a 10 ml. aliquot of the acidic mixture was titrated with 0.05 M $Na_2S_2O_3$. Enzyme activity was measured as the amount of reducing groups formed as a result of the enzymic hydrolysis of the pectic acid. There were essentially no reducing groups in the pectic acid solution before incubation with the enzyme. A calibration curve was prepared using a standard galacturonic acid solution. One unit of enzyme activity is defined as that amount of enzymes that will liberate one micromole of reducing groups per minute.

The pectinase enzyme preparation used in this work is prepared by Wallerstein Co., Morton Grove, Ill., and it is marketed as Klerzyme 200 powder. The enzyme was assayed following the above assay procedure using 0.25 g. of Klerzyme 200 powder per assay; Klerzyme 200 powder was found to possess 640 units of pectinase activity per gram.

Data in the following examples is given in terms of results obtained by conducting standard tests which may be described as follows: The bulk density was measured by weighing the tea powder into a tared volumetric cylinder and tapping the cylinder 1000 times in a tapping machine. The tapping machine used was a Numinco Model JEL-ST2, J. Engelsmann A. G., Ludwigshafen (Rhine), Germany. The volume occupied by the tapped tea powder is read off the scale on the volumetric cylinder and the tapped bulk density is calculated as grams per cubic centimeter.

The tri-stimulus color determinations and haze determination were obtained using a Hunter D–25 Colorimeter made by the Hunter Research Associates of Fairfax, Va. The haxe values are determined by reflectance and the figures given indicate the amount of reflected light. The tri-stimulus color determination are measurements of the transmitted light. The L value is the "lightness" factor, a value of 100 indicates no color, whereas a value of 0 indicates a very dark color. The $a$ value is a measure of the red-blue range of colors whereas a $b$ is a measure of the green-yellow line.

EXAMPLE 2

Twenty-six pounds of a blend of back teas was extracted in a 2-cell counter-current extraction system similar to that described by Seltzer et al. (U.S. Pat. No. 2,902,368). A water to leaf ratio of 8 to 1 was used in this work. One solids was obtained in a single batch. This extract was concentrated under reduced pressure to 6.08% solids, cooled to 40° F., and the tea cream which formed was removed using a Westphalia Model No. KDD604 centrifuge. The cream, which amounted to 24.9% of the extract solids, was solubilized by alkalinizing with 13% (tea solids basis) KOH, air sparged for 10 minutes, and finally bleached with 13% $H_2O_2$. The solubilized tea cream was added back to the decreamed extract and the temperature was adjusted to 85° F. Then 2% Klerzyme 200 of the strength given in Example 1 above was added to the extract which was held between 80 and 90° F., and stirred gently for 20 min. At this time, the extract was polished by adding 1.8% $CaCl_2$, total tea solids basis, cooling to 50° F., and centrifuging. The polished extract was concentrated, and filled by adding corn syrup solids equal in weight to the tea solids. Different extracts prepared by this procedure were spray dried to bulk densities of 0.294 g./cc., 0.321 g./cc., 0.432 g./cc., and 0.450 g./cc., the variations being obtained by introduction of varying amounts of a gas into the spray dried feed according to methods known in the art.

Based upon visual observation, all of these instant tea products were much clearer and redder in color than a control product made by the same process but without the Klerzyme treatment. Further, the three products with the highest bulk densities had an appreciably reduced tendency to form foam on reconstitution with cold water.

Analytical data obtained on two of the instant tea products, i.e. products A and B, which were treated with pectinase are summarized in Table 1. Analytical data for a control instant tea product, i.e. product C, which was prepared by the same procedure except that the pectinase treatment was omitted is also summarized in Table I.

TABLE I

| Product Number | Powder bulk density (g./cc.) | Reconstituted beverage color and clarity | | | | Powder Characteristics | | |
|---|---|---|---|---|---|---|---|---|
| | | Tri-stimulus color | | | | Haze (Hunter units) | Rate of solution | Reconstituted beverage foam |
| | | L | a | b | Subjective description | | | |
| A | 0.432 | 25.0 | 31.8 | 17.3 | Clear, bright, reddish | 12.9 | Excellent | Fair amount, active, clean. |
| B | 0.294 | 23.6 | 31.2 | 16.5 | Clear, dark red | 14.8 | Good to excellent | Fair amount, not clean. |
| C[1] | 0.104 | 24.4 | 25.4 | 17.4 | Slight hazy, brownish yellow. | 64.8 | Fair-good | Fair amount, not active, dirty. |

[1] Control instant tea product made without pectinase treatment.

EXAMPLE 3

Ten thousand and one hundred pounds of an extract of tea solids that contained tea cream solids which had been solubilized by an alkaline/air sparge/hydrogen peroxide oxidation process similar to that described in Example 2 above was treated with pectinase as follows: 12.6 pounds of Klerzyme 200 of the strength given in Example 1 was added to the tank in which the tea extract was being held at 83° F. The extract was stirred for 20 minutes after which 1.8% calcium chloride, based on total tea solids, and the extract was polished at 60° F. by centrifugation, according to Example 2. The polished extract was concentrated, filled with an equal weight of corn syrup solids, and spray dried. A control run, identical to that described above was made in which the pectinase treatment was eliminated. Analytical data obtained on these products are summarized in Table II.

TABLE II

| Instant tea | Tapped bulk density (g./cc.) | Tri-stimulus color | | | Haze (Hunter units) | Foam on reconstitution |
|---|---|---|---|---|---|---|
| | | L | a | b | | |
| Pectinase treated | 0.54 | 20.8 | 26.0 | 14.4 | 49.8 | Virtually none. |
| Control: No pectinase treatment | 0.52 | 27.8 | 27.9 | 19.2 | 74.2 | Some foam. |

These results show that the pectinase treated instant tea product was redder in color (it had a larger *a* minus L value), clearer (the haze value was lower), and it formed far less foam than the control product.

What is claimed is:

1. A process for preparing tea powders comprising forming an aqueous extract of tea, treating said extract by adding thereto a pectinase enzyme preparation in an amount sufficient to degrade partially the tea pectins in the tea extract, to reduce the tendency of the extract to form foam, and to insure clarity and redness of color upon reconstitution and wherein the temperature during the pectinase enzyme treatment is from about 50° F. to about 110° F. and further wherein the pectinase enzyme is held in the tea extract from about 180 to 10 minutes depending upon the amount of enzyme added and the temperature at which said treatment is carried out; precipitating the pectinase enzyme and cold water insoluble materials out from the solution; separating the precipitated pectinase enzyme and other insoluble material from the tea extract and thereafter, spray drying the treated tea extract to a bulk density of at least about .35 g./cc. in order to ensure a low foam formation upon reconstitution of the powdered tea extract.

2. A powdered instant tea product, when prepared according to the process of claim 1.

3. A process according to claim 1, wherein the temperature maintained during the pectinase enzyme treatment is preferably from about 80° F. to about 90° F.

4. A process according to claim 1, wherein a pectinase enzyme preparation having a strength equivalent to about 640 enzyme units per gram is used at a level of about 0.2% to 2.0% by weight of the total tea solids contained in the aqueous tea extract.

5. A process according to claim 4, wherein the treated tea extract is concentrated, filled with an amount of corn syrup solids approximately equal to the tea solids on a weight basis, and spray-dried.

6. A process according to claim 1, wherein the aqueous tea extract, prior to the addition of the pectinase enzyme preparation thereto, is decreamed, forming a tea cream precipitate.

7. A process according to claim 6, wherein the tea cream precipitate is solubilized and thereafter added back to the decreamed extract.

8. A process according to claim 7, wherein the cream add back tea extract is contacted with $CaCl_2 \cdot H_2O$ and thereafter centrifuged to remove any precipitate formed.

References Cited
UNITED STATES PATENTS

| | | | |
|---|---|---|---|
| 3,163,539 | 12/1964 | Barch | 99—76 X |
| 2,927,860 | 3/1960 | Seltler et al. | 99—77 |
| 2,891,866 | 6/1959 | Schroeder | 99—77 |
| 1,932,833 | 10/1933 | Willaman et al. | 99—106 |
| 3,100,151 | 8/1963 | Breivik et al. | 99—77 X |
| 3,335,012 | 8/1967 | Bassett et al. | 99—106 |
| 3,236,655 | 2/1966 | Murch et al. | 99—106 |
| 3,397,061 | 8/1968 | Katz | 99—23 X |
| 3,666,484 | 5/1972 | Gurkin et al. | 99—77 |
| 3,065,077 | 11/1962 | Mishkin et al. | 99—77 |
| 2,912,334 | 11/1959 | Wetherilt | 99—77 |

OTHER REFERENCES

Chem. Abstracts, vol. 54, 13488i.

FRANK W. LUTTER, Primary Examiner

S. L. WEINSTEIN, Assistant Examiner

U.S. Cl. X.R.

426—193